United States Patent
Saida et al.

(10) Patent No.: US 9,323,000 B2
(45) Date of Patent: Apr. 26, 2016

(54) WAVEGUIDE-TYPE POLARIZATION BEAM SPLITTER

(75) Inventors: Takashi Saida, Atsugi (JP); Yusuke Nasu, Atsugi (JP); Takayuki Mizuno, Atsugi (JP); Ryoichi Kasahara, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 114 days.

(21) Appl. No.: 13/981,304

(22) PCT Filed: Jan. 25, 2012

(86) PCT No.: PCT/JP2012/000476
§ 371 (c)(1),
(2), (4) Date: Jul. 23, 2013

(87) PCT Pub. No.: WO2012/102041
PCT Pub. Date: Aug. 2, 2012

(65) Prior Publication Data
US 2013/0301977 A1 Nov. 14, 2013

(30) Foreign Application Priority Data

Jan. 26, 2011 (JP) ................................. 2011-014546

(51) Int. Cl.
*G02B 6/27* (2006.01)
*G02B 6/126* (2006.01)
*G02B 27/28* (2006.01)

(52) U.S. Cl.
CPC .............. *G02B 6/2706* (2013.01); *G02B 6/126* (2013.01); *G02B 27/283* (2013.01)

(58) Field of Classification Search
None
See application file for complete search history.

(56) References Cited

U.S. PATENT DOCUMENTS

| 5,694,496 A * | 12/1997 | Ando et al. ...................... 385/11 |
| 6,115,514 A | 9/2000 | Ando et al. |
| 8,346,030 B2 * | 1/2013 | Hashizume et al. ............ 385/11 |
| 8,787,710 B2 * | 7/2014 | Mizuno ............. G02B 6/12007 385/11 |
| 2001/0022878 A1 * | 9/2001 | Saida et al. ..................... 385/27 |
| 2010/0104237 A1 | 4/2010 | Nasu et al. |

(Continued)

FOREIGN PATENT DOCUMENTS

| CN | 101573645 | 11/2009 |
| CN | 101784926 | 7/2010 |

(Continued)

OTHER PUBLICATIONS

English Machine Translation of JP2007-286426.*

(Continued)

*Primary Examiner* — John M Bedtelyon
(74) *Attorney, Agent, or Firm* — Workman Nydegger

(57) ABSTRACT

Provided is a waveguide-type polarization beam splitter in which deterioration of a polarization extinction ratio due to temperature change and wavelength change is suppressed. The waveguide-type polarization beam splitter includes: input optical waveguides; a first multimode interference optical coupler; a pair of optical waveguide arms; a second multimode interference optical coupler; and output optical waveguides. A quarter wavelength delay is provided in one of the pair of optical waveguide arms, a groove is formed to extend across both of the pair of optical waveguide arms, and two quarter wave plates are provided in the groove to extend respectively across the arms. Polarization axes of the respective quarter wave plates are orthogonal to each other.

12 Claims, 10 Drawing Sheets

(56) References Cited

U.S. PATENT DOCUMENTS

| 2012/0063716 | A1 | 3/2012 | Mizuno et al. |
| 2012/0207474 | A1 | 8/2012 | Inoue et al. |

FOREIGN PATENT DOCUMENTS

| EP | 0 623 830 | 11/1994 |
| EP | 1302793 | 4/2003 |
| JP | 4-241304 | 8/1992 |
| JP | 07-092326 | 4/1995 |
| JP | 11-30766 | 2/1999 |
| JP | 2001-50860 | 2/2001 |
| JP | 2001-255567 | 9/2001 |
| JP | 2007-286426 | 11/2007 |
| WO | 2008084707 | 7/2008 |
| WO | 2010140363 | 9/2010 |

OTHER PUBLICATIONS

International Preliminary Report on Patentability and Written Opinion dated Aug. 8, 2013 for related PCT Application No. PCT/JP2012/000476.
International Search Report, dated Feb. 23, 2012, from related PCT Application No. PCT/JP2012/000476.
U.S. Appl. No. 13/981,285, Oct. 7, 2014, Non Final Office Action.
U.S. Appl. No. 13/981,285, Apr. 9, 2015, Final Office Action.
U.S. Appl. No. 13/981,285, Jul. 31, 2015, Advisory Action.
International Search Report dated Mar. 21, 2010 from corresponding PCT Application No. PCT/JP2012/000474.
International Preliminary Report on Patentability and Written Opinion dated Aug. 8, 2013 from corresponding PCT Application No. PCT/JP2012/000474.
Extended European Search Report dated Jan. 22, 2014 in EP App No. 12739739.6.
Nasu et al.; "Polarization insensitive Mach-Zehnder interferometer by orthogonal half-waveplate alignment;" NTT photonics Labs and NTT Network Innovation Labs, NTT Corp.; Institute of Electronics, Information, and Communication Engineers; Sep. 10-14, 2007, p. 129.
Notice of Allowance in corresponding Japanese Patent Application No. 2012-554690; Dated Jun. 17, 2014.
Office Action dated Feb. 15, 2015 in corresponding Chinese Patent App No. 201280006559.4.
Office Action in corresponding Chinese Patent Application No. 201280006557.5 dated Mar. 23, 2015.
U.S. Appl. No. 13/981,285, Oct. 7, 2015, Notice of Allowance.
Office Action issued on Aug. 17, 2015 in corresponding Chinese Application No. 201280006557.5.

\* cited by examiner

WAVEGUIDE-TYPE POLARIZATION BEAM SPLITTER

TECHNICAL FIELD

The present invention relates to a waveguide-type polarization beam splitter, and more specifically, to a waveguide-type polarization beam splitter which couples and splits polarized waves.

BACKGROUND ART

Polarized and multiplexed optical signals are increasingly used for large-capacity optical communications and importance of polarization beam splitters for coupling and splitting polarized waves is increasing. Particularly, a waveguide-type polarization beam splitter is attracting attention because the waveguide-type polarization beam splitter can be integrated with other waveguide-type devices such as a coupler, a delayed interferometer, and an optical hybrid. The waveguide-type polarization beam splitter generally achieves a polarization wave coupling-splitting function as follows. A phase difference of $\pi$ is provided between a TE polarization and a TM polarization in a configuration of a Mach-Zehnder interferometer (MZI) and the phase difference of the TE polarization in the interferometer is set to 0 (or $\pi$) while the phase difference of the TM polarization in the interferometer is set to $\pi$ (or 0).

FIG. 1 shows an example of a conventional waveguide-type polarization beam splitter. The conventional waveguide-type polarization beam splitter includes input optical waveguides 101a, 101b, a first optical coupler 102, a pair of waveguide arms 103, a groove 104 provided to extend across the waveguide arms, quarter wave plates 105a, 105b of angles of 0° and 90° which are inserted in the groove 104, a second optical coupler 106, and output optical waveguides 107a, 107b (see Patent Literature 1). Since the wave plates inserted in the respective arms give the phase difference between the polarized waves in this method, a polarization beam splitter excellent in temperature characteristics can be achieved.

CITATION LIST

Patent Literature

PTL 1: Japanese Patent Laid-Open No. H07-92326 (1995)

SUMMARY OF INVENTION

Technical Problem

However, the conventional configuration has a problem that wavelength dependence is large. In the configuration of FIG. 1, since directional couplers are used for the first optical coupler 102 and the second optical coupler 106, the wavelength dependence of the directional couplers occurs. Moreover, since the quarter wave plates 105 give phases of 90° and −90° to the polarization TE and the polarization TM orthogonal thereto, a delay portion of a quarter wavelength needs to be provided in the waveguide arm 103a or 103b for the operation of the polarization beam splitter. Since the delay portion has the wavelength dependency, the characteristics of the polarization beam splitter deteriorate.

FIG. 2 is a view showing the wavelength characteristics of the conventional waveguide-type polarization beam splitter which is ideally manufactured. As is apparent from FIG. 2, even in the ideally-manufactured conventional waveguide-type polarization beam splitter, an extinction ratio deteriorates to a level equal to or below 25 dB in a wavelength range of 1.53 to 1.565 microns.

FIG. 3 shows a histogram of the conventional waveguide-type polarization beam splitter in a case where the manufacturing tolerance is considered. Even in a case where the manufacturing tolerance is considered, the extinction ratio of a port 1 is equal to or below 25 dB.

The present invention has been made in view of the above problems and an object thereof is to provide a waveguide-type polarization beam splitter in which deterioration of a polarization extinction ratio due to temperature change and wavelength change is suppressed.

Solution to Problem

To achieve such an object, a first aspect of the present invention provides a waveguide-type polarization beam splitter which is formed on a substrate and which includes: one or two input optical waveguides; a first multimode interference optical coupler optically coupled to the one or two input optical waveguides and having two inputs and two outputs; a pair of optical waveguide arms optically coupled to the outputs of the first multimode interference optical coupler; a second multimode interference optical coupler optically coupled to the pair of optical waveguide arms and having two inputs and two outputs; and one or two output optical waveguides optically coupled to the outputs of the second multimode interference optical coupler. The waveguide-type polarization beam splitter is characterized in that a quarter wavelength delay is provided in one of the pair of optical waveguide arms, a groove is provided to extend across both of the pair of optical waveguide arms, two quarter wave plates are inserted in the groove to extend respectively across the pair of optical waveguide arms, and polarization axes of the respective two quarter wave plates are orthogonal to each other.

A second aspect of the present invention is the first aspect characterized in that at least one of the input optical waveguide and the output optical waveguide is a single optical waveguide, and the quarter wavelength delay is provided in one of the optical waveguide arms on a side opposed to the single optical waveguide with the multimode interference optical coupler coupled to the single optical waveguide interposed therebetween.

A third aspect of the present invention is the first or second aspect characterized in that an angle of the polarization axis of one of the two quarter wave plates is 0° with respect to a substrate plane of a waveguide while an angle of the polarization axis of another one of the two quarter wave plates is 90° with respect to the substrate plane of the waveguide.

A fourth aspect of the present invention is any one of the first to third aspects characterized in that each of the two quarter wave plates is a polyimide wave plate.

A fifth aspect of the present invention is any one of the first to fourth aspects characterized in that the waveguide-type polarization beam splitter further comprises tapered portions before and after the groove.

A sixth aspect of the present invention is any one of the first to fifth aspects characterized in that each of the optical waveguides is a quartz-based optical waveguide formed on a silicon substrate.

Advantageous Effects of Invention

The groove is provided to extend across both of the pair of optical waveguide arms forming a MZI, the two quarter wave plates are inserted in the groove to extend respectively across the pair of optical waveguide arms, quarter wave plates whose polarization axes are orthogonal to each other are used as the two quarter wave plates, and the multimode interference optical couplers which each have two inputs and two outputs are used as the couplers. This can provide a waveguide-type polarization beam splitter in which deterioration of the polarization extinction ratio due to wavelength change and temperature change is suppressed.

DESCRIPTION OF EMBODIMENTS

Embodiments of the present invention are described below with reference to the drawings.

Figure 4:
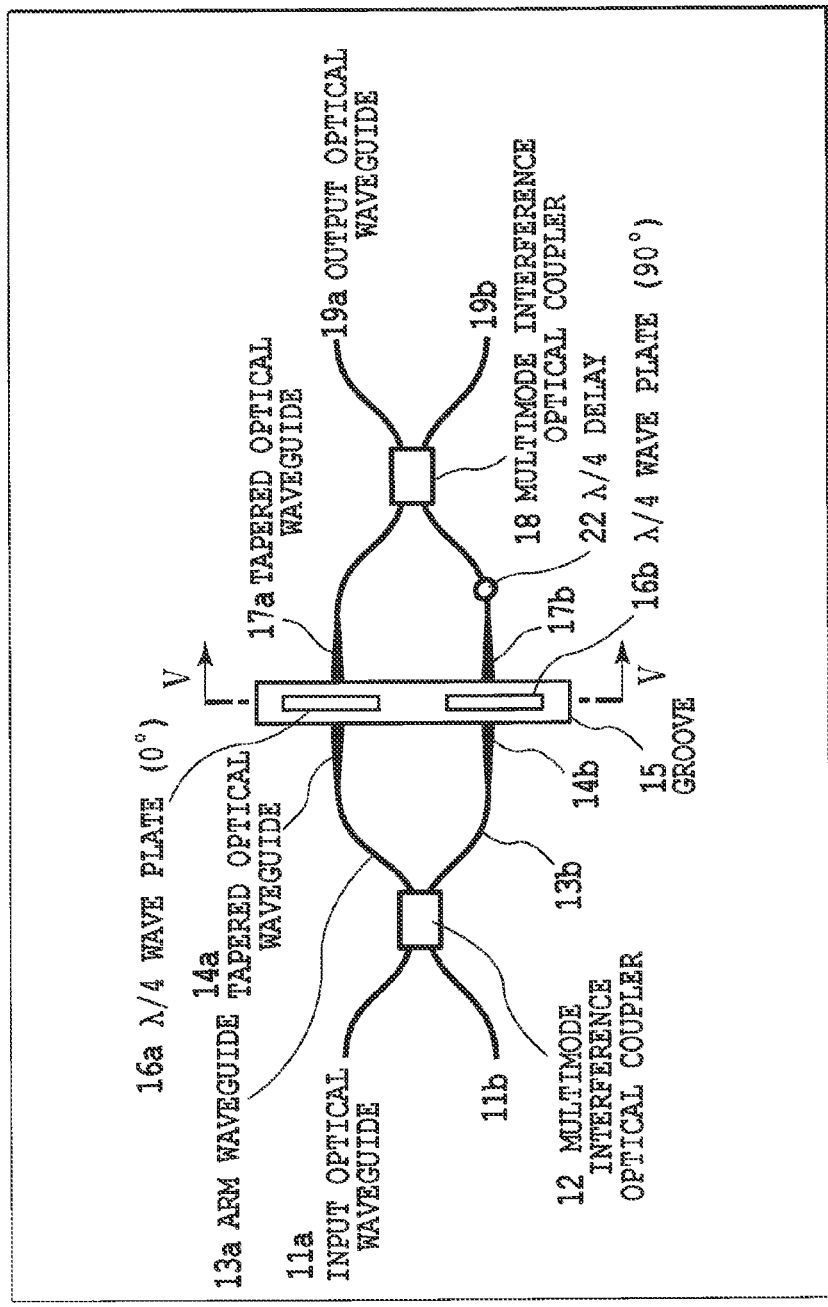
FIG. 4 is a view showing a waveguide-type polarization beam splitter in a first embodiment of the present invention.

FIG. 4 shows a waveguide-type polarization beam splitter of a first embodiment. The waveguide-type polarization beam splitter includes: two input optical waveguides 11 (specifically, 11a and 11b); a first multimode interference optical coupler 12 which are optically coupled to the two input optical waveguides 11 and which has one input and two outputs; a pair of optical waveguide arms 13 (specifically, 13a and 13b) which is optically coupled to the first multimode interference optical coupler 12; a second multimode interference optical coupler 18 which is optically coupled to the pair of optical waveguide arms 13a and 13b and which has two inputs and two outputs; and two output optical waveguides 19a, 19b which are optically coupled to the outputs of the second multimode interference optical coupler 18. A delay 22 is provided in one optical waveguide arm 13b of the pair of optical waveguide arms. The first multimode interference optical coupler 12, the pair of optical waveguide arms 13, and the second multimode interference optical coupler 18 form a MZI.

In the waveguide-type polarization beam splitter of the embodiment, a groove 15 is formed for the pair of optical waveguide arms 13 to extend across both of the arms 13a, 13b. Two quarter wave plates 16a, 16b are provided in the groove 15 to extend across the arms 13a, 13b, respectively. Quarter wave plates whose polarization axes are orthogonal to each other are used as the two quarter wave plates 16a, 16b. In such a configuration, the two arms 13a, 13b, including the inserted wave plates, are completely symmetric to each other except in the directions of the polarization axes. Accordingly, temperature dependence is small.

Each of the arms 13a, 13b included in the pair of optical waveguide arms 13 can be, for example, a silica-based optical waveguide having a relative index difference of 1.5% on a silicon substrate. This optical waveguide has such advantages that a connection loss with an optical fiber is less than 0.6 dB/point and the mass productivity and controllability are excellent.

The number of the input optical waveguides is two and the number of the output optical waveguides is two. This is because this combination can provide a waveguide-type polarization beam splitter which can achieve all of the functions required as a polarization beam splitter such as coupling polarized waves inputted from the two input optical waveguides and splitting polarized waves inputted from one of the input waveguides into the two output optical waveguides. However, the present invention is not limited to this combination. As a matter of course, the number of the input optical waveguides may be one. Moreover, the number of the output optical waveguides may also be one.

The quarter wave plates 16a, 16b can be manufactured from polyimide. Since the quarter wave plates 16a, 16b made of polyimide are thin, the groove 15 in which the quarter wave plates 16a, 16b are inserted can have such a narrow width as less than 20 μm, for example. Setting the angles of the polarization axes to 0° and 90° with respect to the line perpendicular to a plane on which the pair of optical waveguide arms 13a and 13b are formed causes the separated polarization waves to become linear polarization waves and handling is facilitated.

Tapered portions 14a, 14b, 17a, 17b may be provided in waveguide portions before and after the groove 15 to reduce an excess loss in the groove 15. The width of a terminal end of each of the tapered portions is preferably 10 μm or more.

Figure 5:
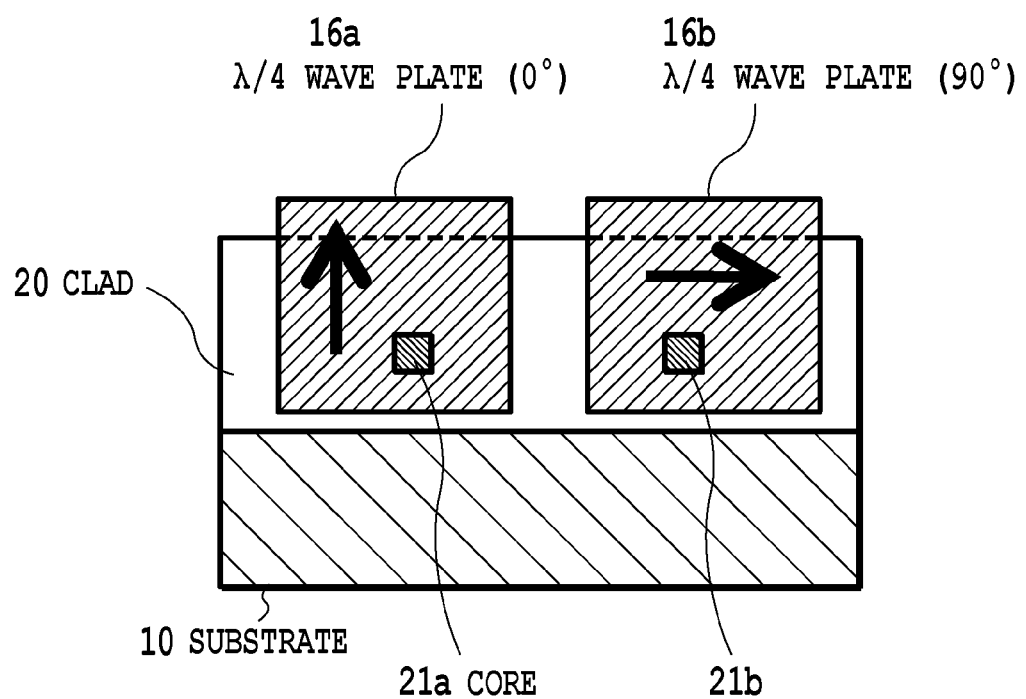
FIG. 5 is a cross-sectional view taken along the V-V line of FIG. 4.

FIG. 5 shows a cross-sectional view taken along the V-V line of FIG. 4. The two arms 13a, 13b are formed on a substrate 10 and the quarter wave plates 16a, 16b are provided to extend across cores of the respective arms 13a, 13b.

Figure 1:
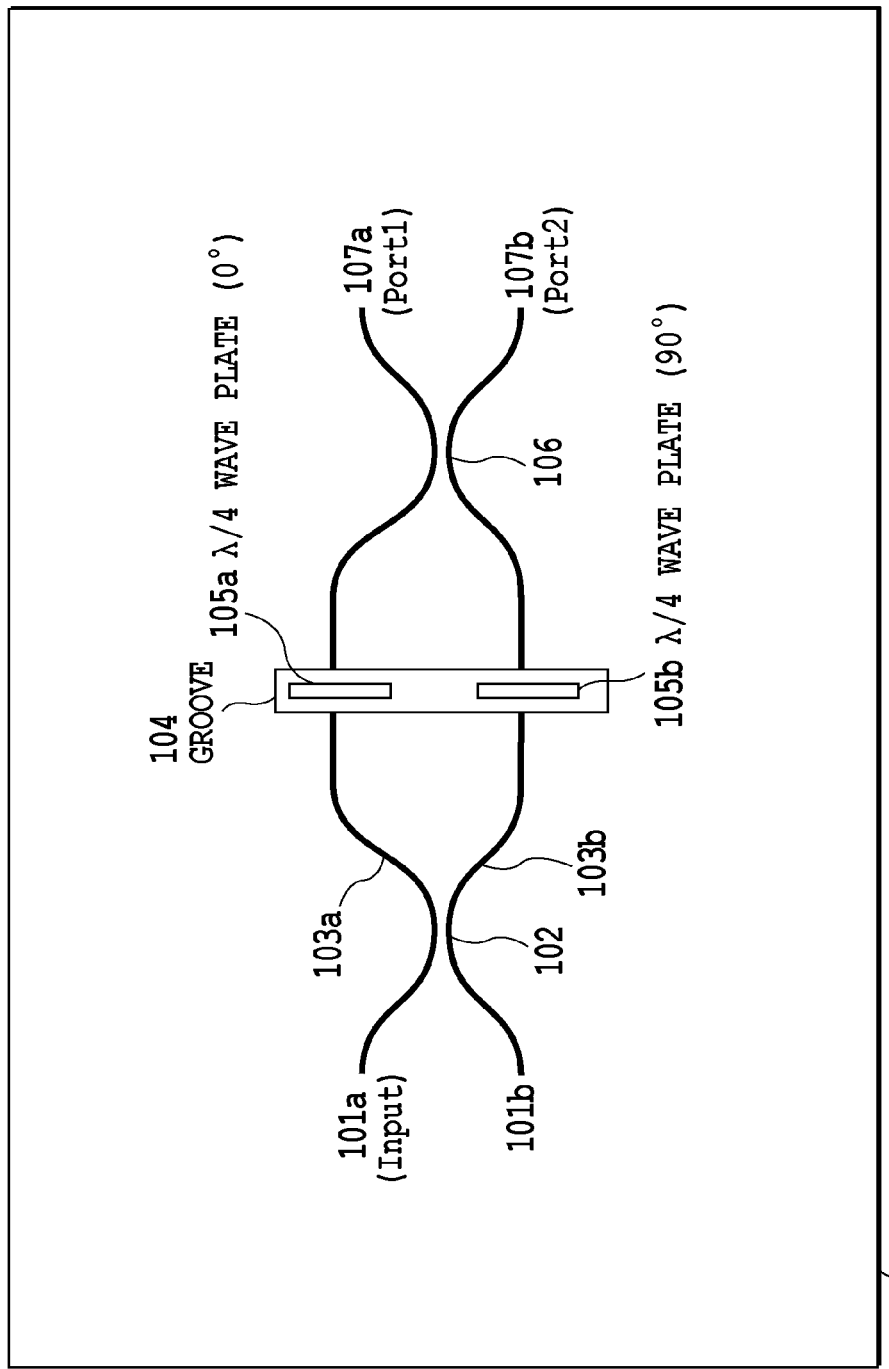
FIG. 1 is a view showing a conventional waveguide-type polarization beam splitter.
Figure 2:
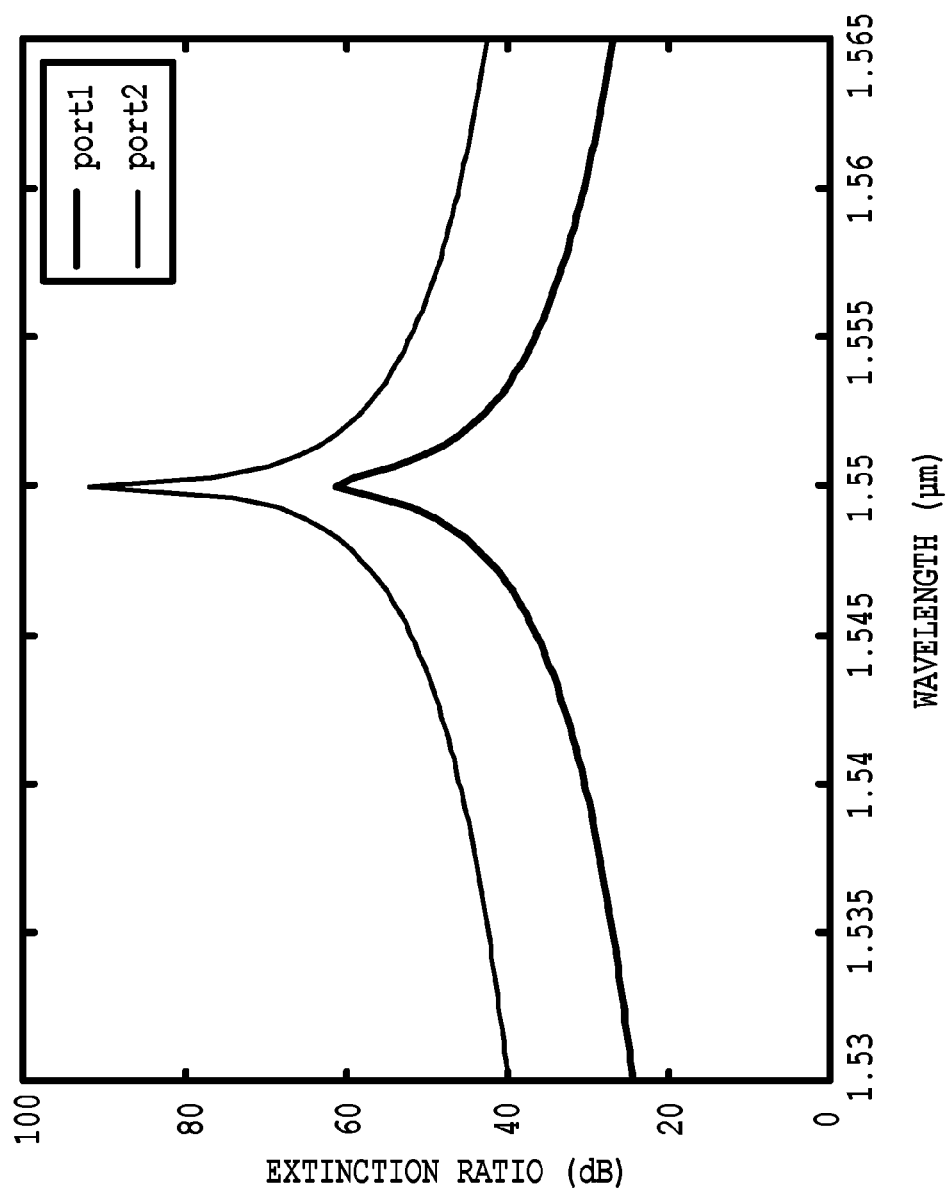
FIG. 2 is a graph showing wavelength dependence of a polarization extinction ratio of the conventional waveguide-type polarization beam splitter.
Figure 6:
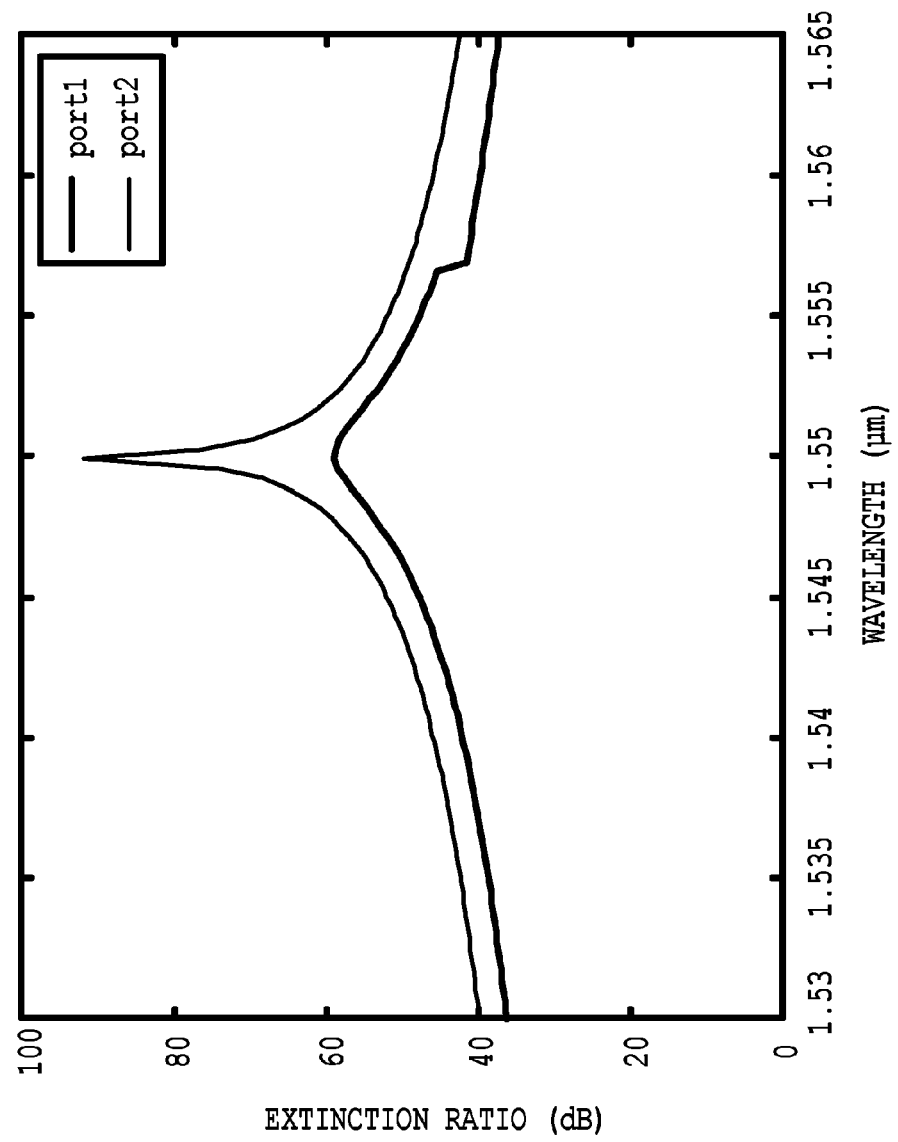
FIG. 6 is a graph showing wavelength dependence of a polarization extinction ratio of a waveguide-type polarization beam splitter in the first embodiment of the present invention.

In contrast to the example shown in FIG. 2, in the waveguide-type polarization beam splitter of the embodiment, the wavelength dependence of the polarization extinction ratio is drastically reduced as shown in FIG. 6.

Figure 3:
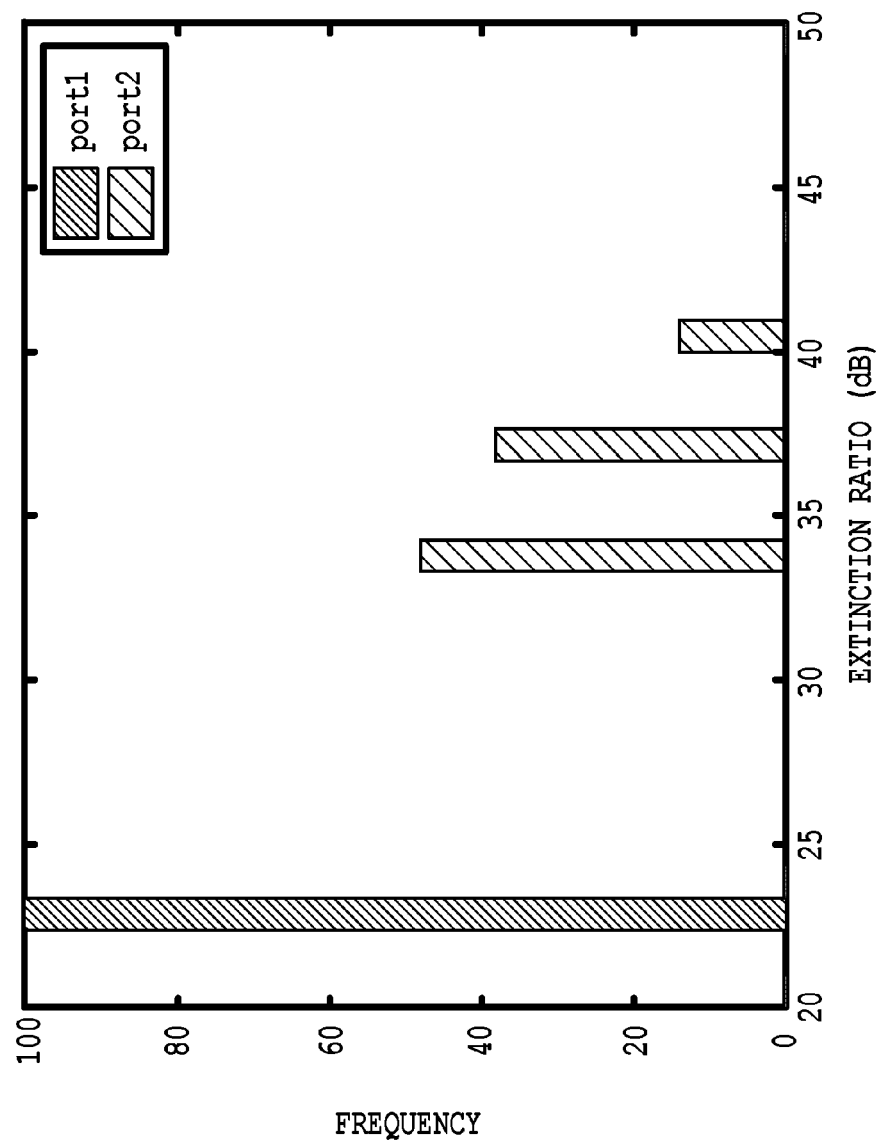
FIG. 3 is a histogram showing the polarization extinction ratio of the conventional waveguide-type polarization beam splitter.
Figure 7:
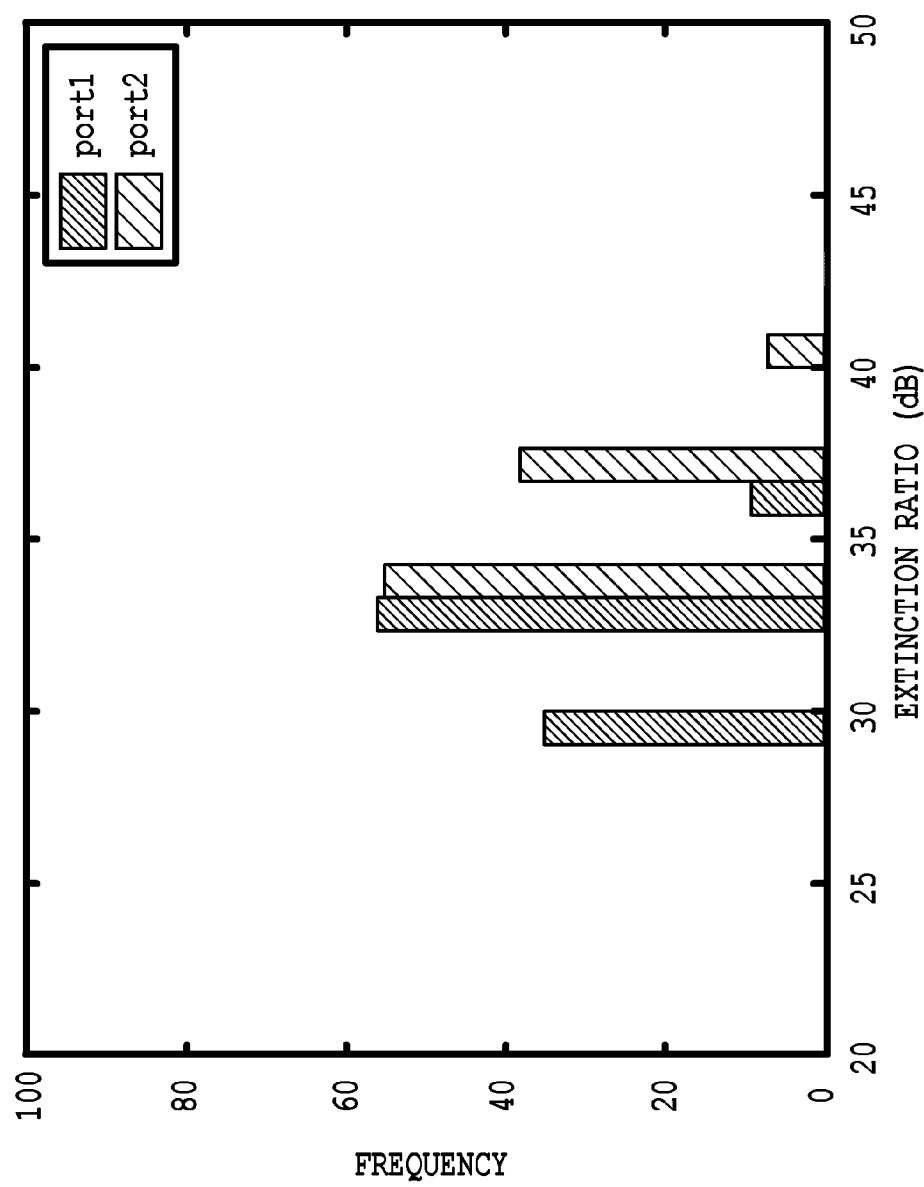
FIG. 7 is a histogram showing the polarization extinction ratio of the waveguide-type polarization beam splitter in the first embodiment of the present invention.

Moreover, in contrast to the example shown in FIG. 3, in the waveguide-type polarization beam splitter of the embodiment, the polarization extinction ratio of 28 dB or more is secured as shown in FIG. 7 in a case where the manufacturing tolerance is considered.

Second Embodiment

Figure 8:
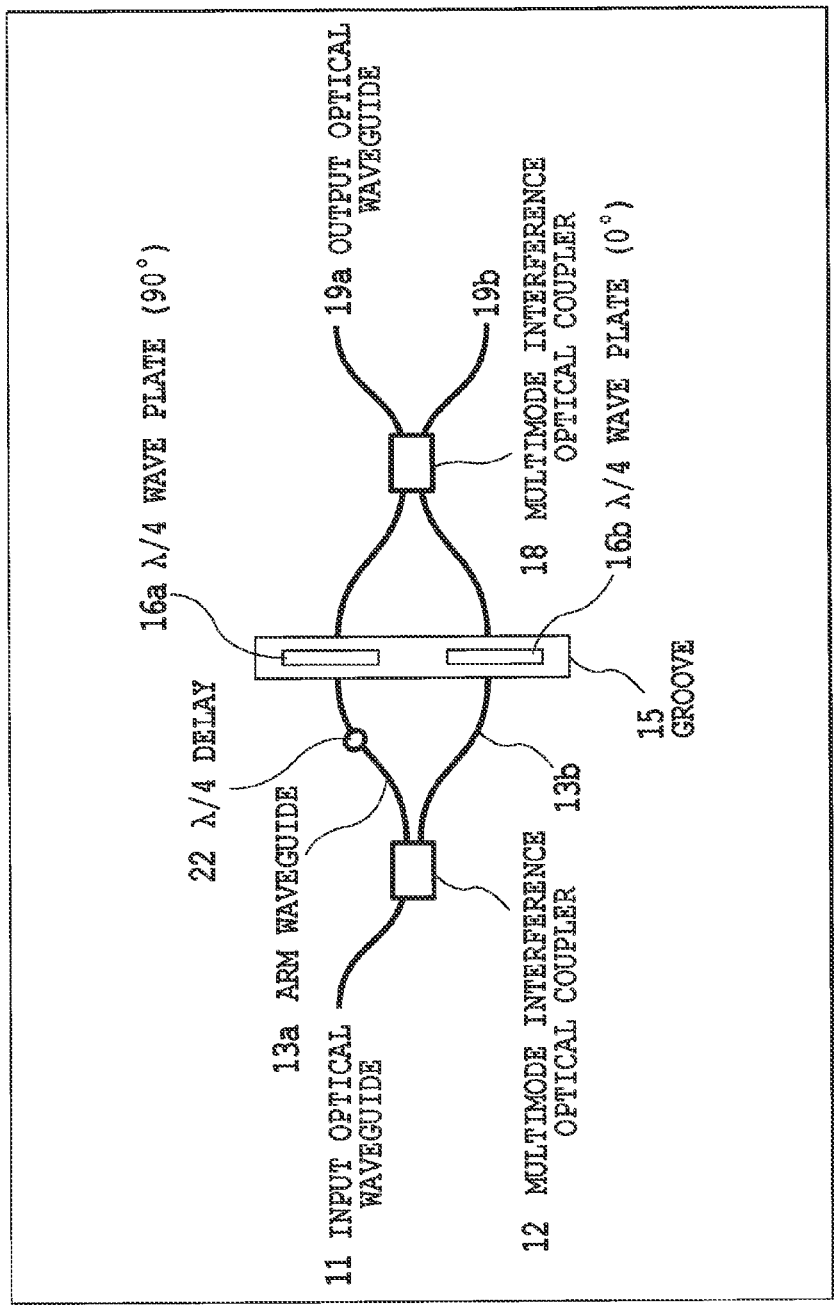
FIG. 8 is a view showing a waveguide-type polarization beam splitter in a second embodiment of the present invention.

FIG. 8 shows a waveguide-type polarization beam splitter of a second embodiment. The waveguide-type polarization beam splitter includes: one input optical waveguide 11; a first multimode interference optical coupler 12 which is optically coupled to the one input optical waveguide 11 and which has two inputs and two outputs; a pair of optical waveguide arms 13 (specifically, 13a and 13b) which are optically coupled to the respective outputs of the first multimode interference optical coupler; a second multimode interference optical coupler 18 which is optically coupled to the pair of optical waveguide arms 13a and 13b and which has two inputs and two outputs; and two output optical waveguides 19a, 19b which are optically coupled to the second multimode interference optical coupler 18. The optical waveguide arm 13a out of the pair of optical waveguide arms 13a, 13b which is opposed to the input optical waveguide with the multimode interference optical coupler 12 interposed therebetween is provided with a quarter wavelength delay 22. The first multimode optical coupler 12, the pair of optical waveguide arms 13 (specifically, 13a and 13b), and the second optical coupler 18 form a MZI.

In the waveguide-type polarization beam splitter of the embodiment, since the quarter wavelength delay 22 is provided in the optical waveguide arm 13a opposed to the input optical waveguide 11 with the multimode interference optical coupler 12 interposed therebetween, the wavelength dependence of a delay portion is cancelled out by the wavelength dependence of the multimode interference optical coupler. Accordingly, the waveguide-type polarization beam splitter with excellent wavelength dependency can be provided.

A groove 15 is formed to extend across both of the arms 13a, 13b and two quarter wave plates 16a, 16b are provided in the groove 15 to extend across the arms 13a, 13b, respectively. Quarter wave plates whose polarization axes are orthogonal to each other are used as the two quarter wave plates 16a, 16b. In such a configuration, the two arms 13a, 13b, including the inserted wave plates, are completely symmetric to each other except in the directions of the polarization axes. Accordingly, the temperature dependence is small.

The number of the output optical waveguides is two because it is possible to provide a waveguide-type polarization beam splitter which can achieve a function of splitting a polarized wave inputted from the one input waveguide into the two output optical waveguides. However, the present invention is not limited to this combination of the embodiment and the number of the output optical waveguides may be one.

Each of the arms 13a, 13b included in the pair of optical waveguide arms 13 can be, for example, a silica-based optical waveguide having a relative index difference of 1.5% on a silicon substrate. This optical waveguide has such advantages that a connection loss with an optical fiber is less than 0.6 dB/point and the mass productivity and controllability are excellent.

Figure 9:
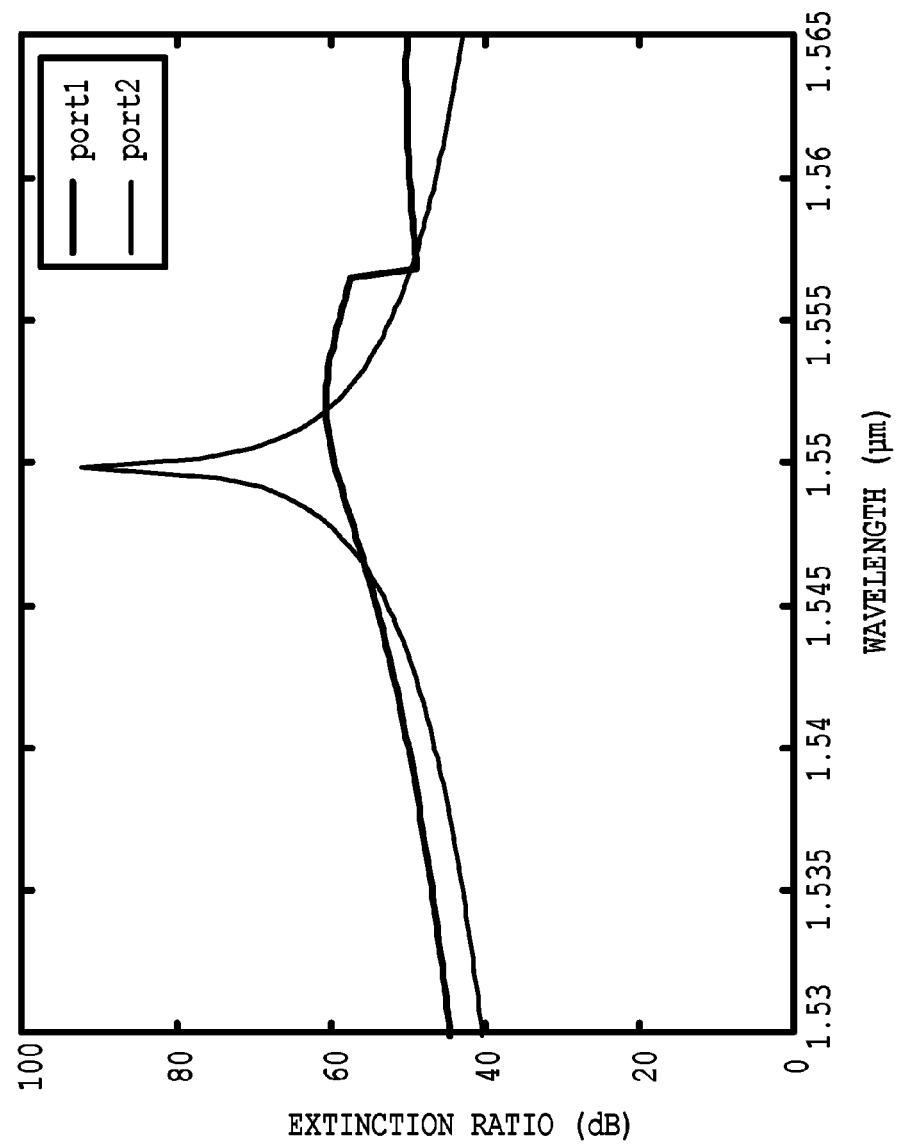
FIG. 9 is a view showing wavelength dependence of a polarization extinction ratio of the waveguide-type polarization beam splitter in the second embodiment of the present invention.

In contrast to the example shown in FIG. 2, in the waveguide-type polarization beam splitter of the embodiment, the wavelength dependence of the polarization extinction ratio is drastically reduced as shown in FIG. 9.

Figure 10:
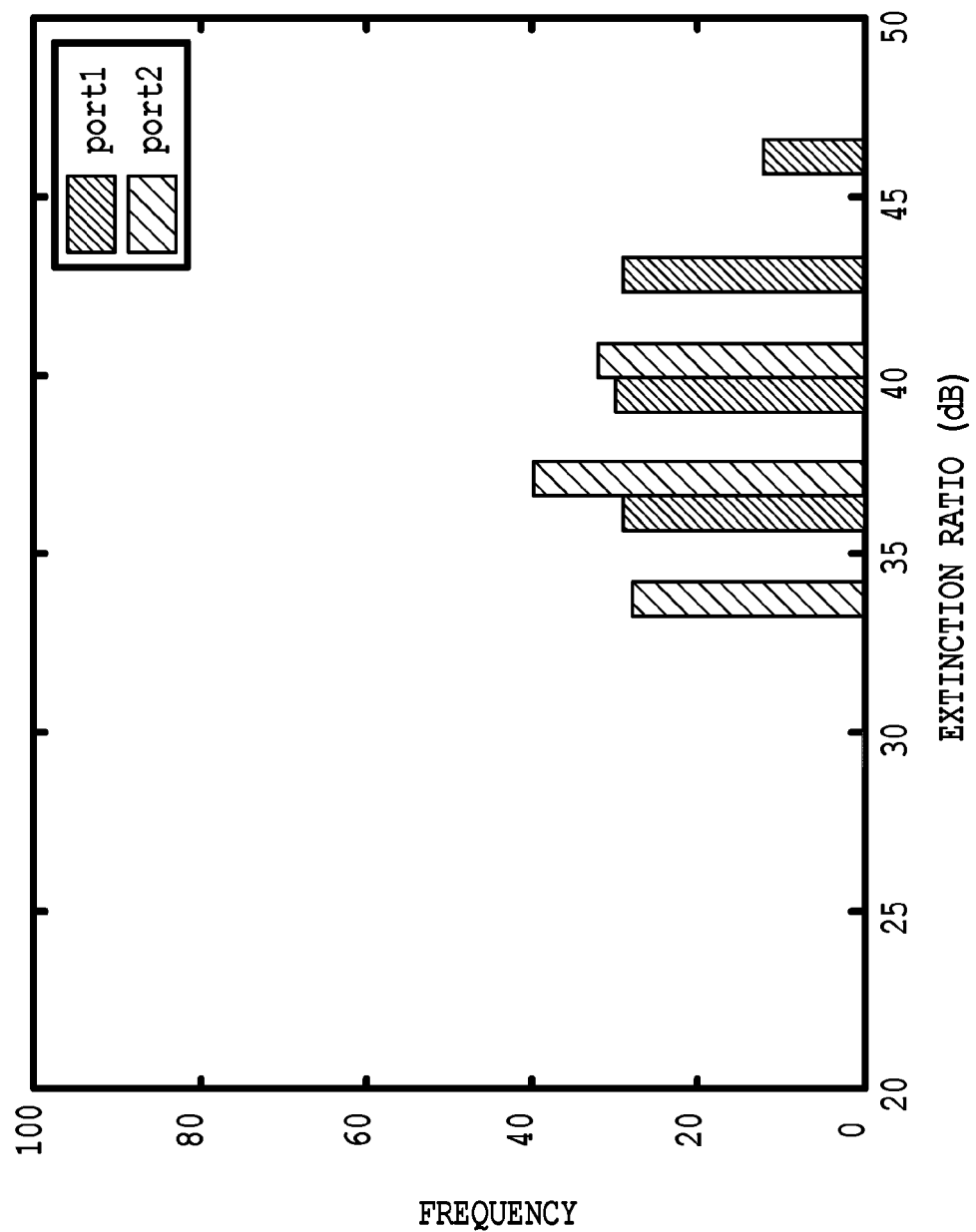
FIG. 10 is a histogram showing the polarization extinction ratio of the waveguide-type polarization beam splitter in the second embodiment of the present invention.

Moreover, in contrast to the example shown in FIG. 3, in the waveguide-type polarization beam splitter of the embodiment, the polarization extinction ratio of 25 dB or more is secured as shown in FIG. 10 in a case where the manufacturing tolerance is considered.

REFERENCE SIGNS LIST 101, 11 Input optical waveguide
102, 12 First optical coupler
103, 13 Pair of optical waveguide arms
104, 15 Waveguide groove
14, 17 Tapered optical waveguide or parabolic optical waveguide
105, 16 Quarter wave plate
106, 18 Second optical coupler
107, 19 Output optical waveguide
20 Clad
21 Core
22 Delay

The invention claimed is:

1. A waveguide-type polarization beam splitter formed on a substrate, the waveguide-type polarization beam splitter comprising:
one or two input optical waveguides;
a first multimode interference optical coupler optically coupled to the one or two input optical waveguides and having two inputs and two outputs;
a pair of optical waveguide arms optically coupled to the outputs of the first multimode interference optical coupler;
a second multimode interference optical coupler optically coupled to the pair of optical waveguide arms and having two inputs and two outputs; and
one or two output optical waveguides optically coupled to the outputs of the second multimode interference optical coupler,
a quarter wavelength delay is provided in one of the pair of optical waveguide arms, wherein wavelength dependence of the quarter wavelength delay is cancelled out by wavelength dependence of the first and second multimode interference optical couplers, and
a groove is provided to extend across the pair of optical waveguide arms, two quarter wave plates are inserted in the groove to extend respectively across the pair of optical waveguide arms, and polarization axes of the respective two quarter wave plates are orthogonal to each other.

2. The waveguide-type polarization beam splitter according to claim 1, wherein:
at least one of the input optical waveguide and the output optical waveguide is a single optical waveguide, and
the quarter wavelength delay is provided in one of the optical waveguide arms on a side opposed to the single optical waveguide with the multimode interference optical coupler coupled to the single optical waveguide interposed therebetween.

3. The waveguide-type polarization beam splitter according to claim 1, wherein an angle of the polarization axis of one of the two quarter wave plates is 0° with respect to a substrate plane of the waveguides while an angle of the polarization axis of another one of the two quarter wave plates is 90° with respect to the substrate plane of the waveguide.

4. The waveguide-type polarization beam splitter according to claim 1, wherein each of the two quarter wave plates is a polyimide wave plate.

5. The waveguide-type polarization beam splitter according to claim 1, wherein the waveguide-type polarization beam splitter further comprises tapered portions before and after the groove.

6. The waveguide-type polarization beam splitter according to claim 1, wherein each of the optical waveguides is a quartz-based optical waveguide formed on a silicon substrate.

7. A waveguide-type polarization beam splitter formed on a substrate, the waveguide-type polarization beam splitter comprising:
an input optical waveguide;
a first multimode interference optical coupler having an input and first and second outputs, the input optical waveguide being optically coupled to the input of the first multimode interference optical coupler;
a second multimode interference optical coupler having two inputs and two outputs;
first and second optical waveguide arms extending respectively from the first and second outputs of the first multimode interference optical coupler to the first and second inputs of the second multimode interference optical coupler, one of the optical waveguide arms having a quarter wavelength delay such that wavelength dependence of the quarter wavelength delay is cancelled out by wavelength dependence of the first and second multimode interference optical couplers;

a pair of output optical waveguides optically coupled to the outputs of the second multimode interference optical coupler; and first and second quarter wave plates extending respectively across the first and second optical waveguide arms, the first and second quarter wave plates being positioned in a groove extending across the first and second optical waveguide arms, the first and second quarter wave plates having polarization axes orthogonal to each other.

8. The waveguide-type polarization beam splitter according to claim 7, wherein:

the input of the first multimode interference optical coupler is a first input and the first multimode optical coupler also has a second input, the input optical waveguide is a single optical waveguide optically coupled to the first input, the first optical waveguide arm is on a side opposed to the single optical waveguide with the first multimode interference optical coupler interposed therebetween, and the quarter wavelength delay is in the first optical waveguide arm.

9. The waveguide-type polarization beam splitter according to claim 7, wherein the angles of the polarization axes of the first and second quarter wave plates is 0° and 90°, respectively, with respect to a substrate plane of the optical waveguide arms.

10. The waveguide-type polarization beam splitter according to claim 7, wherein each of the quarter wave plates is a polyimide wave plate.

11. The waveguide-type polarization beam splitter according to claim 7, wherein the first and second optical waveguide arms each comprise tapered portions on either side of the groove.

12. The waveguide-type polarization beam splitter according to claim 7, wherein each of the optical waveguides is a quartz-based optical waveguide formed on a silicon substrate.

* * * * *